(12) United States Patent
Asakawa et al.

(10) Patent No.: US 11,747,225 B2
(45) Date of Patent: Sep. 5, 2023

(54) STRAIN GAUGE WITH IMPROVED STABILITY AND STRESS REDUCTION

(71) Applicant: MINEBEA MITSUMI Inc., Nagano (JP)

(72) Inventors: Toshiaki Asakawa, Shizuoka (JP); Shinichi Niwa, Shizuoka (JP); Shintaro Takata, Nagano (JP); Shinya Toda, Shizuoka (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 17/043,898

(22) PCT Filed: Apr. 1, 2019

(86) PCT No.: PCT/JP2019/014528
§ 371 (c)(1),
(2) Date: Sep. 30, 2020

(87) PCT Pub. No.: WO2019/194145
PCT Pub. Date: Oct. 10, 2019

(65) Prior Publication Data
US 2021/0018383 A1    Jan. 21, 2021

(30) Foreign Application Priority Data

Apr. 5, 2018 (JP) .................. 2018-073438

(51) Int. Cl.
*G01L 1/22* (2006.01)

(52) U.S. Cl.
CPC .................. *G01L 1/2287* (2013.01)

(58) Field of Classification Search
None
See application file for complete search history.

(56) References Cited

U.S. PATENT DOCUMENTS

| 3,867,231 A | 2/1975 | Casey |
| 4,658,233 A | 4/1987 | Uchida et al. |

(Continued)

FOREIGN PATENT DOCUMENTS

| CN | 1467757 | 1/2004 |
| CN | 1701219 | 11/2005 |

(Continued)

OTHER PUBLICATIONS

International Search Report for PCT/JP2019/014528 dated Jun. 25, 2019.

(Continued)

*Primary Examiner* — Brandi N Hopkins
*Assistant Examiner* — Nigel H Plumb
(74) *Attorney, Agent, or Firm* — IPUSA, PLLC

(57) ABSTRACT

A strain gauge includes a flexible substrate, and a resistor formed of material containing at least one from among chromium and nickel, on or above the substrate. The resistor includes a first layer that is a lowermost layer; and a second layer that is a surface layer laminated on or above the first layer. The second layer is a layer having a higher density than the first layer. The first layer has a first surface provided on a side where the flexible resin substrate is situated, the functional layer being laminated on the first surface. The first layer has a second surface on which the second layer is laminated.

8 Claims, 4 Drawing Sheets

(56) References Cited

U.S. PATENT DOCUMENTS

| | | | |
|---|---|---|---|
| 4,737,757 A | 4/1988 | Senda et al. | |
| 4,758,816 A | 7/1988 | Blessing et al. | |
| 4,786,887 A | 11/1988 | Bringmann et al. | |
| 4,876,893 A | 10/1989 | Kato et al. | |
| 4,894,635 A | 1/1990 | Yajima et al. | |
| 4,937,550 A | 6/1990 | Tawada et al. | |
| 5,154,247 A | 10/1992 | Nishimura et al. | |
| 5,328,551 A | 7/1994 | Kovacich | |
| 5,349,746 A | 9/1994 | Gruenwald et al. | |
| 5,455,453 A | 10/1995 | Harada et al. | |
| 5,622,901 A | 4/1997 | Fukada | |
| 5,914,168 A * | 6/1999 | Wakamatsu | G11B 5/7264 428/141 |
| 6,512,510 B1 | 1/2003 | Maeda | |
| 7,347,464 B2 | 3/2008 | Tanabe | |
| 7,649,278 B2 | 1/2010 | Yoshida et al. | |
| 8,232,026 B2 | 7/2012 | Kumar et al. | |
| 9,256,119 B2 | 2/2016 | Nam et al. | |
| 9,306,207 B2 | 4/2016 | Woo et al. | |
| 9,827,951 B2 | 11/2017 | Toda | |
| 11,087,905 B2 | 8/2021 | Asakawa et al. | |
| 11,131,590 B2 | 9/2021 | Inamori et al. | |
| 2003/0016116 A1 | 1/2003 | Blaha | |
| 2004/0056321 A1 | 3/2004 | Parsons | |
| 2004/0140868 A1 | 7/2004 | Takeuchi et al. | |
| 2005/0160837 A1 | 7/2005 | Tellenbach et al. | |
| 2005/0188769 A1* | 9/2005 | Moelkner | G01L 9/08 73/715 |
| 2005/0276990 A1 | 12/2005 | Kohara et al. | |
| 2006/0162434 A1 | 7/2006 | Saito et al. | |
| 2008/0253085 A1 | 10/2008 | Softer | |
| 2009/0178877 A1 | 7/2009 | Keller et al. | |
| 2011/0109701 A1 | 5/2011 | Ohashi | |
| 2012/0190166 A1 | 7/2012 | Okuda | |
| 2013/0082970 A1 | 4/2013 | Frey et al. | |
| 2013/0181808 A1 | 7/2013 | Chen et al. | |
| 2013/0300254 A1 | 11/2013 | Fujii et al. | |
| 2015/0188769 A1 | 7/2015 | Gu | |
| 2015/0276517 A1 | 10/2015 | Ashida et al. | |
| 2015/0296607 A1 | 10/2015 | Yang et al. | |
| 2015/0348900 A1 | 12/2015 | Nishimura et al. | |
| 2016/0114584 A1 | 4/2016 | Abbot, Jr. et al. | |
| 2016/0282205 A1 | 9/2016 | Huo et al. | |
| 2016/0334289 A1 | 11/2016 | Kieffer et al. | |
| 2016/0372606 A1 | 12/2016 | Ito et al. | |
| 2017/0123548 A1 | 5/2017 | Shih et al. | |
| 2017/0199096 A1 | 7/2017 | Miyajima | |
| 2017/0261388 A1 | 9/2017 | Ma et al. | |
| 2017/0294387 A1 | 10/2017 | Kawabata et al. | |
| 2017/0336900 A1 | 11/2017 | Lee et al. | |
| 2017/0363486 A1 | 12/2017 | Okulov | |
| 2017/0370796 A1 | 12/2017 | Dusing et al. | |
| 2018/0080842 A1 | 3/2018 | Otsu et al. | |
| 2018/0217016 A1 | 8/2018 | Inamori et al. | |
| 2018/0275001 A1 | 9/2018 | Tokuda | |
| 2020/0076016 A1 | 3/2020 | Riemer et al. | |
| 2020/0271533 A1 | 8/2020 | Yuguchi et al. | |
| 2020/0292294 A1 | 9/2020 | Misaizu et al. | |
| 2020/0333199 A1 | 10/2020 | Asakawa et al. | |
| 2021/0003378 A1 | 1/2021 | Asakawa et al. | |
| 2021/0018382 A1 | 1/2021 | Misaizu et al. | |
| 2021/0033476 A1 | 2/2021 | Toda et al. | |
| 2021/0063259 A1 | 3/2021 | Misaizu et al. | |
| 2021/0247210 A1 | 8/2021 | Asakawa et al. | |
| 2021/0270683 A1 | 9/2021 | Kitamura et al. | |

FOREIGN PATENT DOCUMENTS

| | | |
|---|---|---|
| CN | 105755438 | 7/2016 |
| CN | 106461484 | 2/2017 |
| CN | 106768524 | 5/2017 |
| CN | 111417830 | 7/2020 |
| EP | 0171467 | 2/1986 |
| EP | 0725392 | 8/1996 |
| EP | 1197737 | 4/2002 |
| EP | 1530708 | 5/2005 |
| EP | 1557653 | 7/2005 |
| EP | 3690385 | 8/2020 |
| JP | S49-042780 | 4/1974 |
| JP | S58-097607 | 6/1983 |
| JP | S58-169150 | 10/1983 |
| JP | S59-164214 | 9/1984 |
| JP | S60-058578 U | 4/1985 |
| JP | S60-104554 U | 7/1985 |
| JP | S61-176803 | 8/1986 |
| JP | S63-245962 | 10/1988 |
| JP | S63-293432 | 11/1988 |
| JP | H01-202601 | 8/1989 |
| JP | H02-117476 | 5/1990 |
| JP | H02-189981 | 7/1990 |
| JP | H03-191802 | 8/1991 |
| JP | H04-038402 | 2/1992 |
| JP | H04-095738 | 3/1992 |
| JP | H05-080070 | 3/1993 |
| JP | H05-145142 | 6/1993 |
| JP | H06-040305 | 2/1994 |
| JP | H06-176903 | 6/1994 |
| JP | H06-300649 | 10/1994 |
| JP | H07-071906 | 3/1995 |
| JP | H07-113697 | 5/1995 |
| JP | H07-306002 | 11/1995 |
| JP | H08-102163 | 4/1996 |
| JP | H08-304200 | 11/1996 |
| JP | H09-016941 | 1/1997 |
| JP | H09-197435 | 7/1997 |
| JP | H10-270201 | 10/1998 |
| JP | 2000-146511 | 5/2000 |
| JP | 2002-221453 | 8/2002 |
| JP | 2003-035506 | 2/2003 |
| JP | 2003-097906 | 4/2003 |
| JP | 2003-324258 | 11/2003 |
| JP | 2004-072715 | 3/2004 |
| JP | 2006-118982 | 5/2006 |
| JP | 2006-170707 | 6/2006 |
| JP | 2007-076491 | 3/2007 |
| JP | 2007-163405 | 6/2007 |
| JP | 2007-173544 | 7/2007 |
| JP | 2010-070850 | 4/2010 |
| JP | 2010-071006 | 4/2010 |
| JP | 2011-240794 | 12/2011 |
| JP | 2012-151338 | 8/2012 |
| JP | 2013-117422 | 6/2013 |
| JP | 2013-217763 | 10/2013 |
| JP | 2014-035239 | 2/2014 |
| JP | 2014-074661 | 4/2014 |
| JP | 2015-031633 | 2/2015 |
| JP | 2016-017882 | 2/2016 |
| JP | 2016-074934 | 5/2016 |
| JP | 2016-136605 | 7/2016 |
| JP | 2016-159666 | 9/2016 |
| JP | 2016-225598 | 12/2016 |
| JP | 2017-067764 | 4/2017 |
| JP | 2017-101983 | 6/2017 |
| JP | 2017-129417 | 7/2017 |
| JP | 2017-191821 | 10/2017 |
| JP | 2017-191822 | 10/2017 |
| JP | 2017-210572 | 11/2017 |
| JP | 2017-210573 | 11/2017 |
| JP | 2018-058549 | 4/2018 |
| JP | 2018-132531 | 8/2018 |
| JP | 2019-066312 | 4/2019 |
| JP | 2019-066313 | 4/2019 |
| JP | 2019-066454 | 4/2019 |
| WO | 2004/074800 | 9/2004 |
| WO | 2017/094368 | 6/2017 |

OTHER PUBLICATIONS

Shintaku, Kazuhiko, "Thin-film manufacturing by a sputtering method and its application", The 1st joint education workshop of National Institute of Technology, Akita College, [online], 2014, [retrieval date Jun. 17, 2019] Internet: URL: http://akita-nct.coop-

(56) References Cited

OTHER PUBLICATIONS edu.jp/assets/uploads/2014/12/6c13667c41571e8378dc2994ce1fcbd4.pdf, non-official translation, published on Dec. 9, 2014. With Partial English Translation.
International Search Report for PCT/JP2018/046854 dated Feb. 12, 2019.
Yujiro Sakurauchi, "Handbook for utilizing industrial materials", Jan. 25, 1989, pp. 114-149, 166-169, 174-175, 226-235.
Office Action dated Sep. 27, 2021 with respect to the corresponding Chinese patent application No. 201880089676.9.
Office Action dated Jan. 28, 2022 with respect to the related U.S. Appl. No. 16/955,329.
Office Action dated Jan. 25, 2022 with respect to the related Japanese patent application No. 2017-246871.
Office Action dated Sep. 6, 2022 with respect to the related Japanese patent application No. 2017-191821.
Office Action dated Sep. 6, 2022 with respect to the related Japanese patent application No. 2017-210571.
Office Action dated Sep. 6, 2022 with respect to the related Japanese patent application No. 2020-098850.
C. Rebholz et al., "Structure, mechanical and tribological properties of nitrogen-containing chromium coatings prepared by reactive magnetron sputtering", Surface and Coatings Technology, vol. 115, Issues 2-3, pp. 222-229, Jul. 18, 1999.
Haruhiro Kobayashi, Nikkan Kogyo Shimbun, Ltd., "Sputter thin film—Fundamentals and Applications", 1st Edition, 1st Printing, p. 102-107, Feb. 25, 1993 (With Partial Translation).
Shigeru Ikeda et al., Osaka National Research Institute, AIST, "Improvement of Oxidation Resistivity of Carbon Material by Borosilicate Glass Impregnation", TANSO, 1994, No. 162, p. 84-91, Jun. 28, 2010.
Kyoritsu Shuppan Co., Ltd., "Dictionary of Crystal Growth", 1st Edition, 1st Printing, p. 50-51, Jul. 25, 2001 (With Partial Translation).
Iwanami Shoten, Publishers., "Dictionary of Chemistry", 4th Edition, 7th Printing, p. 364, Jul. 20, 1992 (With Partial Translation).
International Search Report for PCT/JP2018/035727 dated Dec. 18, 2018.
Mars J R: "New Strain Gages are Similar to Thin Film Resistors, Permit Analysys of Multilayer Boards", Insulation, Circuits, Lake Publishing Co., Libertyville, IL, US, vol. 19, No. 11, Oct. 1, 1973 (Oct. 1, 1973), pp. 35-37, XP009047141, ISSN: 0020-4544 "the whole document".
Office Action dated May 28, 2021 with respect to the related Chinese patent application No. 201880076801.2.
Extended European Search Report dated Jun. 4, 2021 with respect to the related European patent application No. 18860610.7.
Office Action dated Dec. 7, 2021 with respect to the related Japanese patent application No. 2017-191821.
Office Action dated Jan. 6, 2022 with respect to the related Chinese patent application No. 201880076443.5.
Office Action dated Jan. 12, 2022 with respect to the related Chinese patent application No. 201880076801.2.
Extended European Search Report dated May 10, 2021 (EP Patent Application No. 18860865.7).
American Technical Publishers Ltd.: "ASM Ready Reference: Thermal Properties of Metals", Apr. 27, 2021 (Apr. 27, 2021), pp. 1-9, XP055799057, Retrieved from the Internet: URL:https://www.owlnet.rice.edu/~msci301/ThermalExpansion.pdf [retrieved on Apr. 27, 2021].
International Search Report for PCT/JP2018/035713 dated Dec. 11, 2018.
Office Action dated Oct. 8, 2020 (U.S. Appl. No. 16/758,506).
Extended European Search Report dated Jun. 17, 2021 with respect to the related European Patent Application No. 18863695.5.
Office Action dated Jun. 1, 2021 with respect to the related Chinese Patent Application No. 201880084755.0.
Office Action dated Dec. 7, 2021 with respect to the related Japanese patent application No. 2017-210571.
Office Action dated Dec. 27, 2021 with respect to the related U.S. Appl. No. 16/650,553.
Office Action dated Apr. 12, 2022 with respect to the related Japanese patent application No. 2018-052421.
Office Action dated Apr. 12, 2022 with respect to the related Japanese patent application No. 2018-052422.
Office Action dated May 3, 2022 with respect to the related U.S. Appl. No. 16/650,963.
Office Action dated Apr. 29, 2022 with respect to the related Chinese patent application No. 201880089676.9 (With Partial Translation).
Office Action dated May 5, 2022 with respect to the related Chinese patent application No. 201980022374.4 (With Partial Translation).
International Search Report for PCT/JP2018/035939 dated Dec. 18, 2018.
International Search Report for PCT/JP2018/040357 dated Jan. 15, 2019.
Office Action dated Dec. 7, 2021 with respect to the corresponding Japanese patent application No. 2020-098850.
Office Action dated Jan. 6, 2022 with respect to the corresponding Chinese patent application No. 201880076750.3.
Office Action dated Jan. 13, 2022 with respect to the related Chinese patent application No. 201880084755.0.
Extended European Search Report dated May 10, 2021 (EP Patent Application No. 18862478.7).
International Search Report for PCT/JP2018/035706 dated Dec. 11, 2018.
Japanese Office Action for 2017-191820 dated Mar. 17, 2020.
Office Action dated Jun. 6, 2022 with respect to the related U.S. Appl. No. 16/650,553.
Office Action dated Oct. 11, 2022 with respect to the related Japanese patent application No. 2017-246871.
Office Action dated Oct. 18, 2022 with respect to the related Japanese patent application No. 2018-052421.
Office Action dated Oct. 18, 2022 with respect to the related Japanese patent application No. 2018-052422.
Office Action dated Nov. 8, 2022 with respect to the related Japanese patent application No. 2018-073438.
Japan Metal Society, "Metal Data Book", 4th Edition, 4th Printing, pp. 132, Jul. 10, 2008 (With Partial Translation).
International Search Report for PCT/JP2019/041164 dated Jan. 21, 2020.
Office Action dated Mar. 23, 2022 with respect to the related Chinese patent application No. 201980069799.0.
Office Action dated Jun. 7, 2022 with respect to the related Japanese patent application No. 2020-553353.
Partial supplementary European search report dated Jun. 21, 2022 with respect to the related European patent application No. 19875503.5.
Extended European Search Report dated Sep. 22, 2022 with respect to the related European patent application No. 19875503.5.
Office Action dated Nov. 15, 2022 with respect to the related Japanese patent application No. 2020-553353.
Office Action dated Jan. 9, 2023 with respect to the related U.S. Appl. No. 17/929,830.
Office Action dated Feb. 4, 2023 with respect to the corresponding Chinese patent application No. 201980022374.4.
Office Action dated Feb. 7, 2023 with respect to the corresponding Japanese patent application No. 2017-210571.
Office Action dated Mar. 7, 2023 with respect to the corresponding Japanese patent application No. 2018-052422.
Office Action dated May 9, 2023 with respect to the corresponding Japanese patent application No. 2018-073438.

* cited by examiner

STRAIN GAUGE WITH IMPROVED STABILITY AND STRESS REDUCTION

TECHNICAL FIELD

The present invention relates to a strain gauge and a method for manufacturing the strain gauge.

BACKGROUND ART

A strain gauge is known to be attached to a measured object to detect strain of the measured object. The strain gauge includes a resistor for detecting strain, and as a resistor material, for example, material including Cr (chromium) or Ni (nickel) is used. For example, the resistor is formed in a predetermined pattern, by etching a metal foil (see, for example, Patent document 1).

CITATION LIST

Patent Document

Patent document 1 Japanese Unexamined Patent Application Publication No. 2016-74934

SUMMARY

However, there are cases of decreasing etch characteristics due to formation of an oxidation layer on a surface of the material used for the resistor, or the like. When the resistor cannot be etched in a desired pattern due to the decrease in the etch characteristics, for example, a given resistance value of the resistor varies, which may result in a problem of a lack of stability of the gauge characteristics.

In view of the point described above, an object of the present invention is to improve stability of gauge characteristics of a strain gauge.

A strain gauge includes a flexible substrate, and a resistor formed of material containing at least one from among chromium and nickel, on or above the substrate. The resistor includes a first layer, that is a lowermost layer; and a second layer that is a surface layer laminated on or above the first layer. The second layer is a layer having a higher density than the first layer.

Effects of the Invention

According to the disclosed technique, stability of gauge characteristics of a strain gauge can be improved

DESCRIPTION OF EMBODIMENTS

One or more embodiments will be hereinafter described with reference to the drawings. In each figure, the same numerals denote the same components; accordingly, duplicative explanations may be omitted.

First Embodiment

Figure 1:
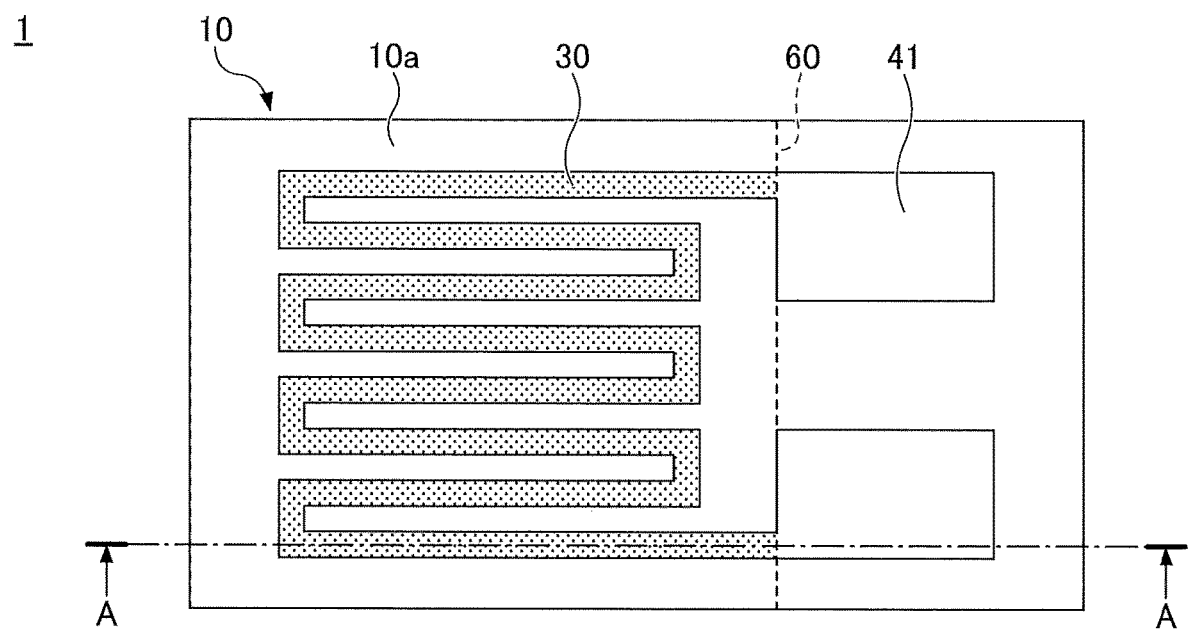
FIG. 1 is a plan view of an example of a strain gauge according to a first embodiment.
Figure 2:
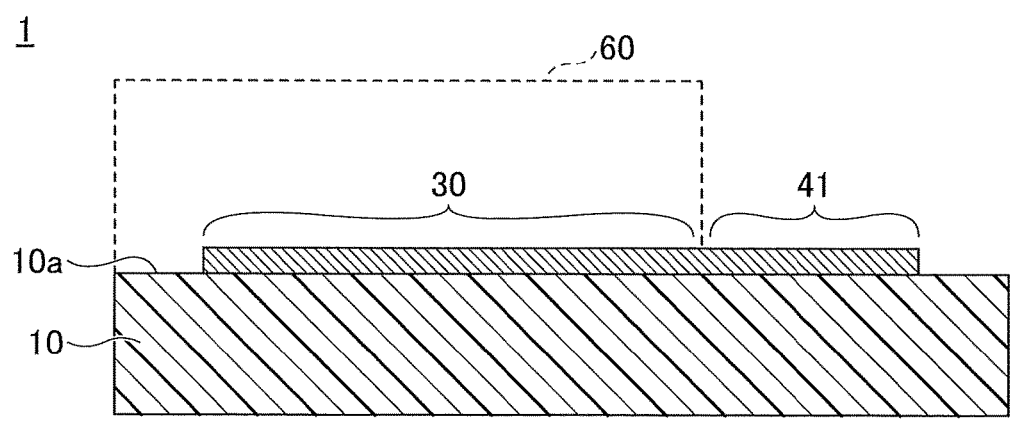
FIG. 2 is a cross-sectional view (part 1) of an example of the strain gauge according to the first embodiment.

FIG. 1 is a plan view of an example of a strain gauge according to a first embodiment. FIG. 2 is a cross-sectional view of an example of the strain gauge according to the first embodiment, and illustrates the cross section taken along the A-A line in FIG. 1. With reference to FIGS. 1 and 2, the strain gauge 1 includes a substrate 10, a resistor 30, and terminal sections 41.

Note that in the present embodiment, for the sake of convenience, with respect to the strain gauge 1, the side of the substrate 10 where the resistor 30 is provided is referred to as an upper side or one side; and the side of the substrate 10 where the resistor 30 is not provided is referred to as a lower side or another side. Further, for each component, the surface on the side where the resistor 30 is provided is referred to as one surface or ah upper surface; and the surface on the side where the resistor 30 is not provided is referred to as another surface or a lower surface. However, the strain gauge 1 can be used in a state of being upside down, or be disposed at any angle. Further, a plan view means that an object is viewed from a direction normal to an upper surface 10a of the substrate 10, and a planar shape refers to a shape of an object when viewed from the direction normal to the upper surface 10a of the substrate 10.

The substrate 10 is a member that is a base layer for forming the resistor 30 or the like and is flexible. The thickness of the substrate 10 is not particularly restricted, and can be appropriately selected for any purpose. For example, such a thickness can be approximately between 5 μm and 500 μm. In particular, when the thickness of the substrate 10 is between 5 μm and 200 μm, it is preferable in terms of strain transfer from a flexure element surface that is bonded to a lower surface of the substrate 10 via an adhesive layer or the like; and dimensional stability with respect to environment, and when the thickness is 10 μm or more, it is further preferable in terms of insulation.

The substrate 10 can be formed of an insulating resin film such as a polyimide (PI) resin, an epoxy resin, a polyether ether ketone (PEEK) resin, a polyethylene naphthalate (PEN) resin, a polyethylene terephthalate (PET) resin, a polyphenylene sulfide (PPS) resin, or a polyolefin resin. Note that the film refers to a flexible member having a thickness of about 500 μm or less.

Here, the "formed of an insulating resin film" is not intended to preclude the substrate 10 from containing fillers, impurities, or the like in the insulating resin film. The substrate 10 may be formed of, for example, an insulating resin film containing fillers such as silica or alumina.

The resistor 30 is a thin film formed on the substrate 10 and in a predetermined pattern, and is a sensitive section where resistance varies according to strain. The resistor 30 may be formed directly on the upper surface 10a of the substrate 10, or be formed above the upper surface 10a of the substrate 10, via other layer(s). Note that in FIG. 1, for the sake of convenience, the resistor 30 is illustrated in a crepe pattern.

The resistor 30 can be formed of, for example, material including Cr (chromium); material including Ni (nickel); or material including both of Cr and Ni. In other words, the resistor 30 can be formed of material including at least one from among Cr and Ni. An example of the material including Cr includes a Cr composite film. An example of the material including Ni includes Cu—Ni (copper nickel). An example of the material including both of Cr and Ni includes Ni—Cr (nickel chromium).

Here, the Cr composite film is a composite film of Cr, CrN, $Cr_2N$, and the like. The Cr composite film may include incidental impurities such as chromium oxide.

The thickness of the resistor 30 is not particularly restricted, and can be appropriately selected for any purpose. The thickness can be, for example, approximately between 0.05 μm and 2 μm. In particular, when the thickness of the resistor 30 is 0.1 μm or more, it is preferable in terms of improvement in crystallinity (e.g., crystallinity of α—Cr) of a crystal that constitutes the resistor 30, and when the thickness of the resistor 30 is 1 μm or less, it is further preferable in terms of reduction in cracks of a given film caused by internal stress of the film that constitutes the resistor 30, or reduction in warp in the substrate 10.

For example, when the resistor 30 is the Cr composite film, the resistor is formed with α—Cr (alpha-chromium) as the main component having a stable crystalline phase, so that stability of the gauge characteristics can be improved. Additionally, when the resistor 30 is formed with α—Cr as the main component, a gauge factor of the strain gauge 1 can be 10 or more, as well as a gauge factor temperature coefficient TCS and temperature coefficient of resistance TCR being able to be each in the range of from −1000 ppm/° C. to 1000 ppm/° C. Here, a main component means that a target substance is 50% by weight or more of total substances that constitute the resistor. The resistor 30 preferably includes α—Cr at 80% by weight or more, from the viewpoint of improving the gauge characteristics. Note that α—Cr is Cr having a bcc structure (body-centered cubic structure).

Figure 3A:
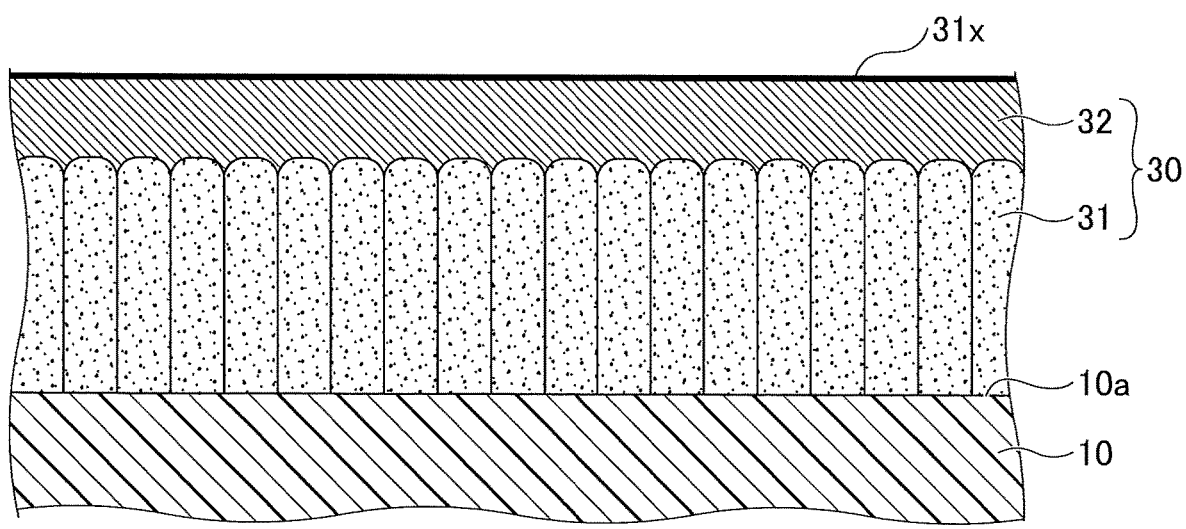
FIG. 3A is a diagram (part 1) for explaining a laminated structure of a resistor.

As illustrated in FIG. 3A, the resistor 30 preferably has a laminated structure in which a second layer 32 is laminated on a first layer 31. The first layer 31 is a layer having a columnar structure with a relatively low density. The second layer 32 is a layer having a homogenous structure with a higher density than the first layer 31. Each of the first layer 31 and the second layer 32 can be formed of α—Cr, for example. Mote that an oxidation layer 31x (autoxidized film) is formed on the surface of the second layer 32.

For the layer having a columnar structure, as described in the first layer 31, when etching is achieved for pattern formation, an accurate pattern shape can be formed, as well as allowing excellent etch characteristics and an increased etch rate.

Figure 3B:
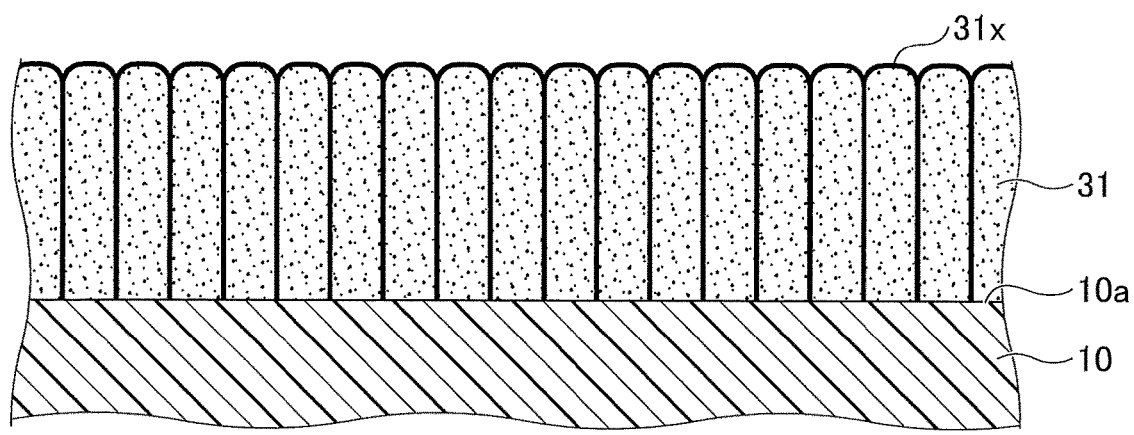
FIG. 3B is a diagram (part 2) for explaining the laminated structure of the resistor.

However, a Cr thin film is likely to form an oxidation layer. For this reason, as illustrated in an example of FIG. 3B, when the resistor is formed with only the first layer 31 having the columnar structure, the oxidation layer 31x is formed on only the surface of the Cr thin film, as in the case with passivation, and further the oxidation layer 31x penetrates into the film. It is considered that this is because a column that constitutes the Cr thin film is covered with oxygen.

Figure 4A:
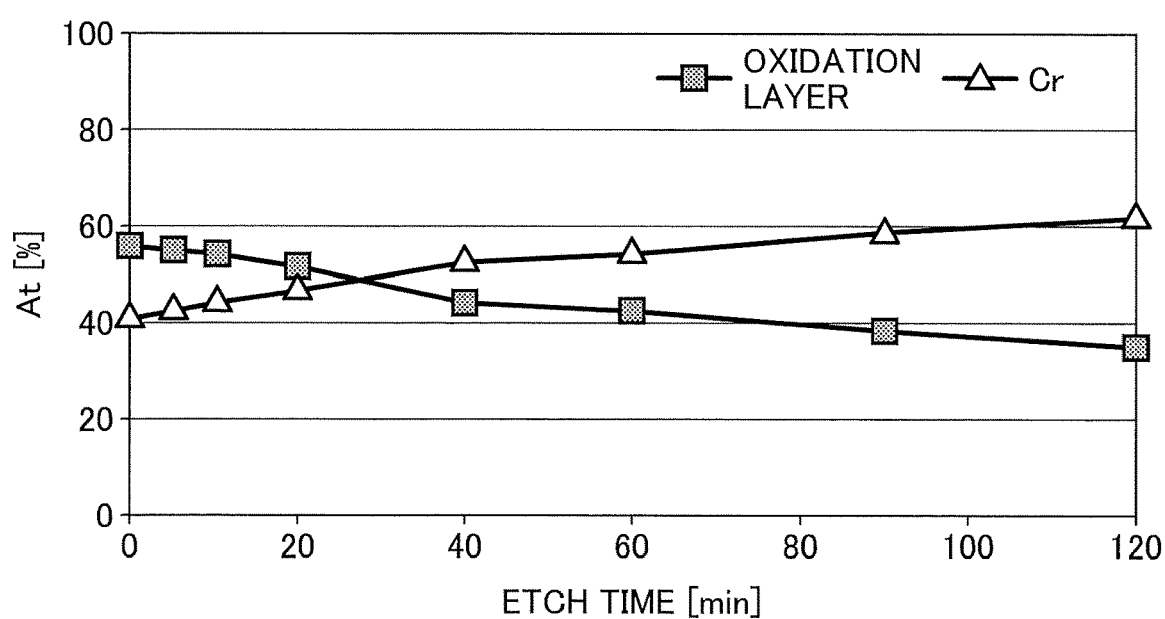
FIG. 4A is a diagram (part 1) for explaining an oxidation layer formed in the resistor.

FIG. 4A is a graph illustrating an oxidation level with respect to the columnar structure, where measurement is performed by X-ray photoelectron spectroscopy (XPS). In FIG. 4A, the horizontal axis represents the etch time (min). In this description, the oxidation level is measured while the Cr thin film is cut by etching. In this case, 0 in the etch time corresponds to the Cr thin film surface. A longer etch time corresponds to a deeper location of the Cr thin film. From FIG. 4A, it is found that the Cr oxidation layer is formed not only on the Cr thin film surface but also at deep locations of the film.

With respect to the Cr thin film for which the oxidation layer is formed on the film surface and in the film, the advantage of the columnar structure as described above is lost, and thus etch characteristics is decreased. If a desirable pattern cannot be formed by etching, gauge characteristics such as resistance values become unstable. Further, there are cases of the gauge characteristics being negatively affected by the presence of the oxidation layer itself.

Figure 3C:
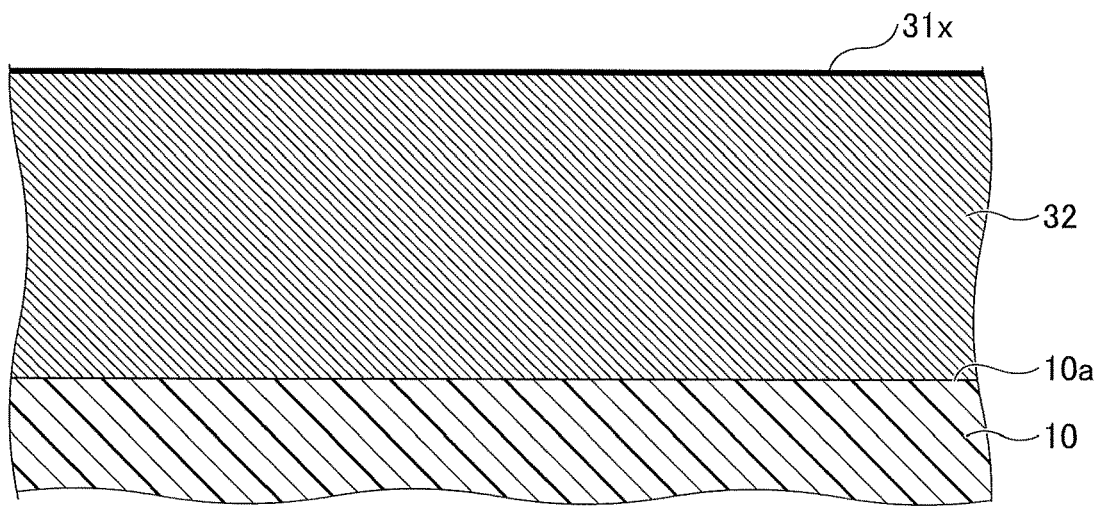
FIG. 3C is a diagram (part 3) for explaining the laminated structure of the resistor.

In contrast, for a Cr thin film having a homogenous structure with a higher density than the first layer 31, as described in the second layer 32, resistance to corrosion increases. Thus, oxidation occurs in proximity to the film surface, but oxidation can decrease in the film. For this reason, as illustrated in an example of FIG. 3C, when the resistor is formed with only the second layer 32 having the homogenous structure with the higher density, oxidation occurs in proximity to the Cr thin film surface so that the oxidation layer 31x is formed. However, the oxidation layer 31x does not penetrate into the film and thus oxidation can decrease in the film.

Figure 4B:
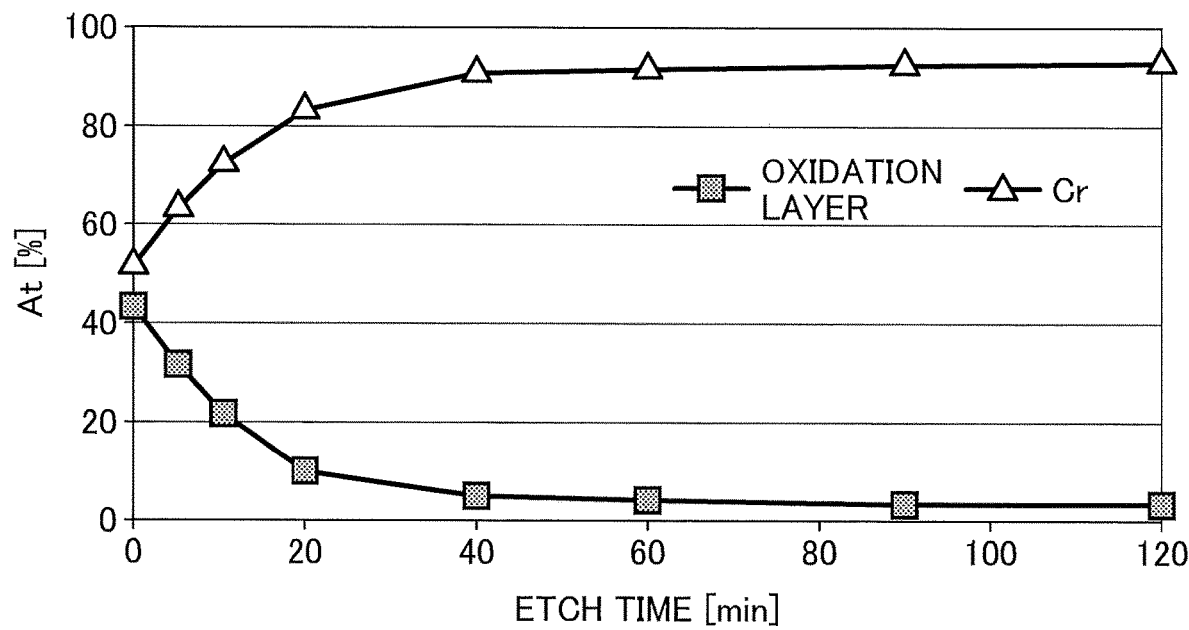
FIG. 4B is a diagram (part 2) for explaining the oxidation layer formed in the resistor.

FIG. 4B is a graph illustrating an oxidation level with respect to the Cr thin film having the homogenous structure, where measurement is performed by the same method as that described in FIG. 4A. From FIG. 4B, it is found that the Cr oxidation layer is formed only in proximity to the Cr thin film surface and is not formed at deep locations of the film.

However, because hardness of the Cr thin film having the homogenous structure is high, when the resistor is formed with only the second layer 32, the film thickness becomes thick, which results in decreased etch characteristics. As a result, if a desired pattern cannot be formed by etching, gauge characteristics such as resistance values become unstable.

In light of the point described above, as illustrated in FIG. 3A, for the resistor 30, the first layer 31 that is the lowermost layer is set as a layer having a columnar structure, and the second layer 32 that is a surface layer (uppermost layer) is set as a layer having a homogenous structure with a higher density than the first layer 31. By depositing such a structure in a vacuum, the first layer 31 can become a layer having a columnar structure in which an oxidation layer is not formed, and a portion at which the oxidation layer 31x is formed can be only proximal to the surface of the second layer 32. Further, when the resistor 30 has the laminated structure, the film thickness of the second layer having the homogenous structure can become thin.

In such a structure, although the oxidation layer 31x that is an autoxidized film is formed on the surface of the second layer 32, the oxidation layer 31x is not formed in the film. Further, the lower layer can have a columnar structure with excellent etch characteristics, so that the etch characteristics of the resistor 30 can be improved. Note that in order to improve the etch characteristics of the resistor 30, the film thickness of the second layer 32 is preferably half or less than half the film thickness of the first layer 31.

Further, in the structure described above, film stress of the resistor 30 that causes warp in the strain gauge 1 can be reduced.

The example of the Cr thin film has been described above. However, for a Cu—Ni thin film or a Ni—Cr thin film, when the resistor 30 has the laminated structure described above, the same effect as that described using the Cr thin film is obtained.

Referring back to FIG. 1 and FIG. 2, the terminal sections 41 respectively extend from both end portions of the resistor 30 and are each wider than the resistor 30 to be formed in an approximately rectangular shape, in a plan view. The terminal sections 41 are a pair of electrodes from which a change in a resistance value of the resistor 30 according to strain is output externally, where, for example, a lead wire for an external connection, or the like is joined. For example, the resistor 30 extends from one of the terminal sections 41, with zigzagged hairpin turns, to be connected to another terminal section 41. The upper surface of each terminal section 41 may be coated with a metal allowing for greater solderability than the terminal section 41. Note that for the sake of convenience, the resistor 30 and the terminal sections 41 are expressed by different numerals. However, the resistor and the terminal sections can be integrally formed of the same material, in the same process.

A cover layer 60 (insulating resin layer) may be disposed on and above the upper surface 10a of the substrate 10, such that the resistor 30 is coated and the terminal sections 41 are exposed. With the cover layer 60 being provided, mechanical damage, and the like can be prevented from occurring in the resistor 30. Additionally, with the cover layer 60 being provided, the resistor 30 can be protected against moisture, and the like. Note that the cover layer 60 may be provided to cover all portions except for the terminal sections 41.

The cover layer 60 can be formed of an insulating resin such as a PI resin, an epoxy resin, a PEEK resin, a PEN resin, a PET resin, a PPS resin, or a composite resin (e.g., a silicone resin or a polyolefin resin). The cover layer 60 may contain fillers or pigments. The thickness of the cover layer 60 is not particularly restricted, and can be appropriately selected for any purpose. For example, the thickness may be approximately between 2 μm and 30 μm.

In order to manufacture the strain gauge 1, first, the substrate 10 is prepared and the resistor 30 and the terminal sections 41 each of which has the planar shape illustrated in FIG. 1 are formed. The material and thickness for each of the resistor 30 and the terminal sections 41 are the same as the material and thickness described above. The resistor 30 and the terminal sections 41 can be integrally formed of the same material.

The resistor 30 and the terminal sections 41 can be formed, for example, such that a raw material capable of forming the resistor 30 and the terminal sections 41 is a target to be deposited by magnetron sputtering, and such that patterning is performed by photolithography. Instead of magnetron sputtering, the resistor 30 and the terminal sections 41 may be deposited by reactive sputtering, vapor deposition, arc ion plating, pulsed laser deposition, or the like.

From the viewpoint of stabilizing the gauge characteristics, before depositing the resistor 30 and the terminal sections 41, preferably, as a base layer, a functional layer having a film thickness that is approximately between 1 nm and 100 nm is vacuum-deposited on the upper surface 10a of the substrate 10, by conventional sputtering, for example. Note that, after forming the resistor 30 and the terminal sections 41 on the entire upper surface of the functional layer, the functional layer, as well as the resistor 30 and the terminal sections 41, are patterned in the planar shape illustrated in FIG. 1, by photolithography.

In the present application, the functional layer refers to a layer that has a function of promoting crystal growth of the resistor 30 that is at least an upper layer. The functional layer preferably further has a function of preventing oxidation of the resistor 30 caused by oxygen and moisture included in the substrate 10, as well as a function of improving adhesion between the substrate 10 and the resistor 30. The functional layer may further have other functions.

The insulating resin film that constitutes the substrate 10 contains oxygen and moisture. In this regard, particularly when the resistor 30 includes Cr, it is effective for the functional layer to have a function of preventing oxidation of the resistor 3C, because Cr forms an autoxidized film.

The material of the functional layer is not particularly restricted as long as it is material having a function of promoting crystal growth of the resistor 30 that is at least an upper layer. Such material can be appropriately selected for any purpose, and in one or more types of metals selected from the group consisting of, for example, Cr (chromium), Ti (titanium), V (vanadium), Nb (niobium), Ta (tantalum), Ni (nickel), A (yttrium), Zr (zirconium), Hf (hafnium), Si (silicon), C (carbo), Zn (zinc), Cu (copper), Bi (bismuth), Fe (iron), Mo (molybdenum), W (tungsten), Ru (ruthenium), Rh (rhodium), Re (rhenium), Os (osmium), Ir (iridium), Pt (platinum), Pd (palladium), Ag (silver), Au (gold), Co (cobalt), Mn (manganese), and Al (aluminum); an alloy of any metals from among the group; or a compound of any metal from among the group.

Examples of the above alloy include FeCr, TiAl, FeNi, NiCr, CrCu, and the like. Examples of the above compound include TiN, TaN, $Si_3N_4$, $TiO_2$, $Ta_2O_5$, $SiO_2$, and the like.

The functional layer can be vacuum-deposited by, for example, conventional sputtering in which a raw material capable of forming the functional layer is the target and in which an Ar (argon) gas is supplied to a chamber. By using conventional sputtering, the functional layer is deposited while the upper surface 10a of the substrate 10 is etched with Ar. Thus, a deposited amount of film of the functional layer is minimized and thus an effect of improving adhesion can be obtained.

However, this is an example of a method of depositing the functional layer, and the functional layer may be formed by other methods. For example, such a method, before depositing the functional layer, the upper surface 10a of the substrate 10 is activated by plasma treatment using Ar, etc. or the like to thereby obtain the effect of improving the adhesion; subsequently, the functional layer may be vacuum-deposited by magnetron sputtering.

A combination of the material of the functional layer and the material of the resistor 30 and the terminal sections 41 is not particularly restricted, and can be appropriately selected for any purpose. For example, Ti is used for the functional layer, and a Cr composite film formed with α—Cr (alpha-chromium) as the main component can be deposited as the resistor 30 and the terminal sections 41.

In this case, each of the resistor 30 and the terminal sections 41 can be deposited by, for example, magnetron sputtering in which a raw material capable of forming the Cr composite film is the target and in which an Ar gas is supplied to a chamber. Alternatively, the resistor 30 and the terminal sections 41 may be deposited by reactive sputtering in which pure Cr is the target and in which an appropriate amount of nitrogen gas, as well as an Ar gas, are supplied to a chamber.

In such methods, a growth face of the Cr composite film is defined by the functional layer formed of Ti, and a Cr composite film that is formed with α—Cr as the main component having a stable crystalline structure can be deposited. Also, Ti that constitutes the functional, layer is diffused into the Cr composite film, so that the gauge characteristics are improved. For example, the gauge factor of the strain gauge 1 can be 10 or more, as well as the gauge factor temperature coefficient TCS and temperature coefficient of resistance TCR being able to be each in the range of from −1000 ppm/° C. to +1000 ppm/° C. Note that, when the functional layer is formed of Ti, the Cr composite film may include Ti or TiN (titanium nitride).

Note that when the resistor 30 is a Cr composite film, the functional layer formed of Ti includes all functions of a function of promoting crystal growth of the resistor 30; a function of preventing oxidation of the resistor 30 caused by oxygen or moisture contained in the substrate 10; and a function of improving adhesion between the substrate 10 and the resistor 30. Instead of Ti, when the functional layer is formed of Ta, Si, Al, or Fe, the functional layer also includes the same functions.

As described above, with the functional layer being provided in the lower layer of the resistor 30, the crystal growth of the resistor 30 can be promoted and thus the resistor 30 having a stable crystalline phase can be fabricated. As a result, with respect to the strain gauge 1, the stability of the gauge characteristics can be improved. Also, the material that constitutes the functional layer is diffused into the resistor 30, so that the gauge characteristics of the strain gauge 1 can be thereby improved.

In order for each of the resistor 30 and the terminal sections 41 to have a laminated structure in which the second layer 32 is laminated on the first layer 31, the first layer 31 and the second layer 32 may be formed by changing a deposition condition in sputtering. For example, pressure of an Ar gas that is supplied to a chamber should be controlled. Although Ar is contained in a given film fabricated by sputtering (peening effect), an Ar content in the film varies by controlling the Ar gas pressure. Thereby, the film density can be adjusted.

Specifically, when the first layer 31 having a columnar structure is deposited, the Ar gas pressure is adjusted to a first value that is relatively great. Thereby, plasma energy is reduced due to collision between sputtered particles and the Ar gas. The sputtered particles randomly enter the substrate so that the columnar structure with a relatively low density is formed.

In contrast, when the second layer 32 having a homogenous structure with a higher density than the first layer 31 is deposited, the Ar gas pressure is adjusted to a second value that is smaller than the first value. Thereby, plasma energy increases and thus the Ar content in the film increases (peening effect is enhanced). Accordingly, the second layer 32 having the homogenous structure with a higher density than the first layer 31 is formed.

The film deposition of the first layer 31 and the film deposition of the second layer 32 are performed within the chamber, as a sequence of processes. Thereby, the first layer 31 and the second layer 32 are deposited without forming the oxidation layer. In other words, the second layer 32 can be deposited on the unoxidized surface that is the upper surface of the first layer 31. Note that in transition from a vacuum chamber to the air, the oxidation layer (autoxidized film) is formed in proximity to the surface of the second layer 32 that is the surface layer. However, the upper surface of the first layer 31 is maintained as the unoxidized surface, without the oxidation layer being formed on the first layer 31 coated with the second layer 32.

Instead of Ar, when a gas containing one or more gases from among neon (Ne), krypton (Kr), and xenon (Xe), which are noble gases, is used, the same effect as that described using Ar is obtained. Further, instead of the Ar pressure control, when sputtering power is controlled, the same effect as that described in the Ar pressure control is obtained.

In other words, when the first layer 31 is deposited, sputtering power is adjusted to a third value that is relatively great. When the second layer 32 is deposited, sputtering power is adjusted to a fourth value smaller than the third value. Thereby, the same effect as that described in the Ar pressure control is obtained.

Note that when the resistor 30 has a laminated structure in which at least the second layer 32 is laminated on or above the first layer 31, the resistor 30 may have a laminated structure with three or more layers. In other words, the resistor 30 may have one or more other layers between the first layer 31 being the lowermost layer and the second layer 32 being a surface layer. In this case, only the second layer 32 that is a surface layer is set as a layer having a homogenous structure with a high density, and one or more lower layers beneath the second layer 32 are each set as a layer having a columnar structure with a lower density than the second layer 32.

When the resistor 30 has a laminated structure with three or more layers, in order to improve etch characteristics of the resistor 30, the film thickness of the second layer 32 is preferably half or less than half a total thickness of layers each having a columnar structure.

When the resistor 30 has a laminated structure with three or more layers, a given density may gradually Increase from the first layer 31 being the lowermost layer to the second layer 32 being a surface layer. For example, by controlling the pressure of the Ar gas, the density of each of the layers having a columnar structure can be adjusted. In such a manner, the density of a given layer from among multiple layers each having a columnar structure gradually increases as the layer is proximal to the surface layer. Thereby, etch characteristics can be further improved.

After forming the resistor 30 and the terminal sections 41, the cover layer 60 with which the resistor 30 is coated and that exposes the terminal sections 41 is formed on and above the upper surface 10a of the substrate 10, as necessary, so that the strain gauge 1 is completed. For example, the cover layer 60 can be fabricated, such that a thermosetting insulating resin film in a semi-cured state is laminated on the upper surface 10a of the substrate 10, and such that the resistor 30 is coated therewith and the terminal sections 41 are exposed; subsequently, heat is added and curing is performed. The cover layer 60 may be formed, such that a thermosetting insulating resin that is liquid or paste-like is applied to the upper surface 10a of the substrate 10, and such that the resistor 30 is coated therewith and the terminal sections 41 are exposed; subsequently, heat is added and curing is performed.

Figure 5:
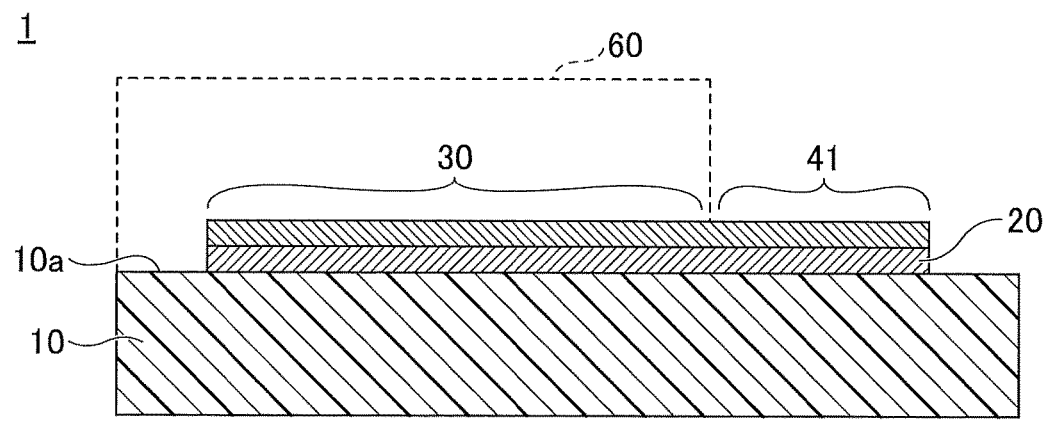
FIG. 5 is a cross-sectional view (part 2) of an example of the strain gauge according to the first embodiment.

Note that when the functional layer, as a base layer of the resistor 30 and the terminal sections 41, is provided on the upper surface 10a of the substrate 10, the strain gauge 1 has the cross-section shape illustrated in FIG. 5. A layer expressed by the numeral 20 indicates the functional layer. The planar shape of the strain gauge 1 in the case of providing the functional layer 20 is the same as that in FIG. 1.

The preferred embodiment and the like have been described above in detail, but are not limited thereto. Various modifications and alternatives to the above embodiment and the like can be made without departing from a scope set forth in the claims.

This International application claims priority to Japanese Patent Application No. 2018-073438, filed Apr. 5, 2018, the contents of which are incorporated herein by reference in their entirety.

REFERENCE SIGNS LIST 1 strain gauge, 10 substrate, 10a upper surface, 20 functional layer, 30 resistor, 31 first layer, 32 second layer, 41 terminal section, 60 cover layer

The invention claimed is:

1. A strain gauge comprising:
a flexible resin substrate;
a functional layer formed of a metal, an alloy, or a metal compound, on one surface of the substrate; and
a resistor formed as a film containing Cr, CrN, and $Cr_2N$, on one surface of the functional layer,
wherein the resistor includes a first layer that is a lowermost layer; and a second layer that is a surface layer laminated on or above the first layer,
wherein the second layer is a layer having a higher density than the first layer, and
wherein the first layer has
a first surface provided on a side where the flexible resin substrate is situated, the functional layer being laminated on the first surface, and
a second surface on which the second layer is laminated.

2. The strain gauge according to claim 1, further comprising one or more other layers between the first layer and the second layer, wherein the density gradually increases from the first layer to the second layer.

3. The strain gauge according to claim 1, wherein one or more lower layers beneath the second layer each have a columnar structure.

4. The strain gauge according to claim 3, wherein a film thickness of the second layer is half or less than half a total thickness of the layers each having the columnar structure.

5. The strain gauge according to claim 1, wherein a main component of the resistor is alpha-chromium.

6. The strain gauge according to claim 5, wherein the resistor includes alpha-chromium at 80% by weight or more.

7. The strain gauge according to claim 1, wherein the functional layer includes a function of promoting crystal growth of the resistor.

8. The strain gauge according to claim 1, further comprising an insulating resin layer with which the resistor is coated.

* * * * *